United States Patent [19]

Gephardt et al.

[11] Patent Number: 5,625,829
[45] Date of Patent: Apr. 29, 1997

[54] DOCKABLE COMPUTER SYSTEM CAPABLE OF SYMMETRIC MULTI-PROCESSING OPERATIONS

[75] Inventors: Douglas D. Gephardt, Austin; Steven L. Belt, Plugerville; Drew J. Dutton, Austin, all of Tex.

[73] Assignee: Advanced Micro Devices, Inc., Tex.

[21] Appl. No.: 276,250

[22] Filed: Jul. 18, 1994

Related U.S. Application Data

[63] Continuation-in-part of Ser. No. 255,663, Jun. 9, 1994, which is a continuation-in-part of Ser. No. 217,951, Mar. 25, 1994.

[51] Int. Cl.[6] .................................................. G06F 3/00
[52] U.S. Cl. ................... 395/800; 395/200.12; 395/306; 395/308; 395/311; 395/728; 395/827; 364/180; 364/229; 364/242.6; 364/242.92; 364/242.93; 364/DIG. 1
[58] Field of Search .................................. 395/800, 325, 395/200, 306, 308, 311, 728, 827; 364/DIG. 1, 242.6, 242.92, 242.93, 180, 229

[56] References Cited

U.S. PATENT DOCUMENTS

| | | | |
|---|---|---|---|
| D. 364,151 | 11/1995 | Yamazaki | D14/107 |
| 4,530,069 | 7/1985 | Desrochers | 364/900 |
| 4,769,764 | 9/1988 | Levanon | 364/708 |
| 4,823,256 | 4/1989 | Bishop et al. | 395/182.08 |
| 4,835,737 | 5/1989 | Herring et al. | 395/283 |
| 4,969,830 | 11/1990 | Daly et al. | 439/136 |
| 5,030,128 | 7/1991 | Herron et al. | 439/372 |
| 5,052,943 | 10/1991 | Davis | 439/357 |
| 5,126,954 | 6/1992 | Morita | 364/708 |
| 5,175,671 | 12/1992 | Sasaki | 361/392 |
| 5,187,645 | 2/1993 | Spalding et al. | 361/393 |
| 5,195,183 | 3/1993 | Miller et al. | 395/275 |
| 5,241,542 | 8/1993 | Natarajan et al. | 370/95.3 |
| 5,265,238 | 11/1993 | Canova, Jr. et al. | 395/500 |
| 5,313,596 | 5/1994 | Swindler et al. | 395/281 |
| 5,394,552 | 2/1995 | Shirota | 395/750 |
| 5,396,400 | 3/1995 | Register et al. | 361/686 |
| 5,463,742 | 10/1995 | Robayashi | 395/281 |
| 5,537,343 | 7/1996 | Kikinis et al. | 364/708.1 |

FOREIGN PATENT DOCUMENTS

| | | |
|---|---|---|
| 0496535 | 7/1992 | European Pat. Off. . |
| 9201191 | 5/1993 | Germany . |

OTHER PUBLICATIONS

English translation of Abstract of Japanese Patent Pub. No. JP4138552, published May 13, 1992, Nippon Steel Corp.
HPSIR, Special Infrared Communications Specification, introduction pages and pp. 1–9.

*Primary Examiner*—Alyssa H. Bowler
*Assistant Examiner*—Dzung C. Nguyen
*Attorney, Agent, or Firm*—Foley & Lardner

[57] ABSTRACT

A dockable computer system is capable of performing symmetrical multi-processing operations. More particularly, the dockable computer system includes a portable computer and a host station (docking station), each including a resident CPU. The dockable computer system is capable of operating in a docked state in which the portable computer is physically joined with the host station and an undocked state in which the portable computer is physically separate from the host station. In the docked state, the dockable computer system is capable of performing demanding computational tasks such as video conferencing as one of the CPUs in either the portable computer or host station is dedicated to the video conferencing operation. The dockable computer system preferably includes a communication channel for transmitting multi-processing support signals between the portable computer and the host station. Multi-processing support signals include synchronization signals, cache coherency signals, and interrupt distribution signals such as the LOCK signal, PLOCK signal, FLUSH signal, EADS signal, INTR signal or INTACK signal. The communication channel may be a dedicated bus or may be provided through a docking bridge between the portable computer and host station. The dockable computer system advantageously optimizes CPU resources when the dockable computer system is in a docked state.

32 Claims, 3 Drawing Sheets

DOCKABLE COMPUTER SYSTEM CAPABLE OF SYMMETRIC MULTI-PROCESSING OPERATIONS

CROSS REFERENCE TO RELATED APPLICATIONS

The present application is a continuation-in-part of U.S. patent application Ser. No. 08/255,663, filed Jun. 9, 1994, entitled "An Apparatus and Method for Granting Control of a Bus in a Computer System," assigned to the assignee of the present invention, which is a continuation-in-part of U.S. patent application Ser. No. 08/217,951, filed Mar. 25, 1994, entitled "An Apparatus and Method for Achieving Hot Docking Capabilities for a Dockable Computer System," also assigned to the assignee of the present invention. The present application is generally related to U.S. patent application Ser. No. 08/217,952, filed Mar. 25, 1994, entitled "A Dockable Computer System Capable of Electric and Electromagnetic Communication," which is likewise assigned to the assignee of the present invention.

TECHNICAL FIELD

The present invention relates generally to a dockable computer system in which a portable computer unit is associated with a stationary host computer through a station unit and, more particularly, to a dockable computer system and method for implementing the system in a manner which enables the portable and station units to perform symmetrical multi-processing operations.

BACKGROUND OF THE INVENTION

A dockable computer system includes a portable computer unit, usually a notebook or laptop, and a stationary or base (host) computer unit having a docking station for receiving the portable computer unit. Dockable computer systems may be operated in a docked state, in which both computer units are physically associated as a generally unified system, or the remote unit may be separated from its host for independent operation in an undocked state.

Rudimentary docking systems of the foregoing variety have been designed in an effort to meet the needs of today's mobile computer users for "ubiquitous" computing system capabilities, to fulfill their computing needs in diverse aspects of their professional and personal lives and in sundry locations. Contemporary dockable computer systems approach this problem through a single system capable of operating as an expandable desktop computer having a detachable mobile computing component or subsystem.

The expandable desktop computer provides greater storage resources, network connectivity, larger displays, and other superior facilities which are necessary for the typical range of generally demanding home and office computing. The portable computer (mobile computer unit) can include a sophisticated CPU and allows the user to have computing capabilities while outside the home or office by detaching that component with its indigenous hardware and resident software. The computing capabilities of the portable computer are somewhat limited due to size, weight and power constraints but represent the best available approach in these embryonic attempts to balance portable mobility needs.

When the user leaves the host environment of home or office, the portable computer is undocked (that is, physically detached) from the docking station of the stationary computer unit. Applications, files, and other data needed for the mobile computing task must have previously been stored in the portable computer. When the user returns to the host environment, the portable computer is reunited (docked) with the docking station so that the applications, the files, and other data are stored and maintained in a single location. Thus, the use of a dockable computer system allows the user to have access to any needed applications, files, and other data just before embarking on the mobile computing task.

Certain complex computing applications require high speed, high performance computer systems such as multiple instruction stream, multiple data stream (MIMD) computers. MIMD computers are capable of performing symmetrical multi-processing (SMP) operations, the simultaneous execution of two or more sequences of instructions by two or more arithmetic or logic units. SMP operations are also known as multi-programming, multi-processing, multi-computing or parallel processing operations.

Generally, SMP-capable computers include two or more CPUs which can both access at least one mutual memory address and are necessary to practically utilize computational intensive, complex data processing or speed dependent applications such as database control (queries) and maintenance, network-based searching, and sophisticated graphic functions. For example, video conferencing software generally includes a video compression/decompression algorithm which places the video conference image on the screen. The high speed requirements and quantitative nature of the compression/decompression algorithm impose a tremendous computational (number crunching) burden on the CPU. The burden is often so great that the CPU cannot practically perform other computing tasks while simultaneously servicing the video conferencing software.

Heretofore, users have utilized a dedicated desktop computer to perform SMP operations because dockable computer systems have not been capable of SMP operations. Two or more CPUs necessary for SMP operations cannot practically be located on the portable computer unit due to size, power and weight constraints, especially in the limited notebook and sub-notebook configurations. Prior art docking stations have not included a CPU for SMP operations or an interface which can accommodate SMP support signals. Prior art docking stations are only linked to the portable computer unit by a low performance transfer bus. Thus, prior art dockable computer systems are incapable of SMP operations and have the same CPU performance when the system is docked as when it is undocked.

Thus, there is a need for a dockable computer system capable of utilizing the high performance CPU of the portable computer for SMP operations. There is also a need for a dockable computer system having a high performance interface capable of communicating SMP support signals. Further, there is a need for a dockable computer system having an architecture optimized for the SMP operations in accordance with "ubiquitous" computing goals.

SUMMARY OF THE INVENTION

The present invention relates to a dockable computer system capable of assuming at least two states, a docked state and an undocked state. The dockable computer system includes a host station having a host bus and a host CPU coupled with the host bus, a portable computer including a computer bus and a portable CPU coupled to the computer bus, and a main memory. The host CPU includes a host cache coupled with the host bus, and the portable CPU includes a portable cache coupled with the portable bus. The host bus is capable of electrical communication with the computer bus when the dockable computer system is in the docked state. The host bus is physically separate from the computer bus when the dockable computer system is in the undocked state. The host CPU is capable of communicating a first data stream or block to and from the memory and the host cache when the dockable computer system is in the docked state. The portable CPU is also capable of communicating a second data stream or block between the main memory and the portable cache when the dockable computer system is in the docked state. The host CPU and the portable CPU are thus capable of symmetrical multi-processing operations when the dockable computer system is in the docked state.

The present invention also relates to a method of symmetrical multi-processing in a dockable computer system including a memory, a portable computer and a host station. The portable computer includes a first CPU, and the host station includes a second CPU. The method includes the steps of performing first processing operations with first CPU, simultaneously performing second processing operations with the second CPU, and transferring multi-processing support signals from the host station to the portable computer and from the portable computer to the host station.

The present invention further relates to a computer system including a main memory, main CPU, a main bus, a host CPU, a host bus and an interface. The main bus is coupled with a main memory and the main CPU, and the host CPU is coupled with the host bus. The interface is coupled with a main bus and the host bus. The host CPU communicates with the main CPU and the main memory across the host bus, the interface and the main bus. The interface includes a communication channel for communicating multi-processing support signals.

The present invention still further relates to a dockable computer system comprised of a host computer station including a host CPU and a station bus and a mobile computer unit including a unit CPU and a unit bus. The system is capable of residing in at least two distinct states, a docked state in which the unit is operatively associated with the station and an undocked state which the unit is physically separate from the station. The improvement includes a channel for communicating multi-processing support signals between the mobile computer unit and the host computer station.

The present invention even further relates to a docking bridge for use in a dockable computer system including a first bus, a second bus and a data path circuit. The data path circuit includes a first clock buffer and a second clock buffer coupled between the first and the second buses. The data path circuit receives a first data stream or block on the first bus, stores it in the first clock buffer for at least one clock cycle, and regenerates the first data on the second bus. The data path circuit also receives a second data stream or block on the second bus, stores it for at least one clock cycle, and regenerates the second data on the first bus.

The present invention advantageously provides an SMP architecture for a dockable computer system which includes a high performance CPU located in the portable computer and at least one CPU located in the docking station. The architecture can include a high performance transfer bus for communicating data between the portable computer and the docking station. Thus, the dockable computer system of the present invention does not compromise SMP performance of the expandable desktop computer (system in the docked state) and yet provides a light-weight portable computer (system in the undocked state).

In one aspect of the present invention, the dockable computer system communicates SMP support signals over a dedicated bus. In another aspect of the present invention, the dockable computer system communications the SMP support signals across a docking bridge interface. In still a further aspect of the present invention, the dockable computer system is capable of simultaneously completing normal computing operations and video conferencing operations. In a yet another aspect of the present invention, the dockable computer system efficiently communicates data over a high performance transfer bus between a sophisticated CPU located in the portable computer unit and a CPU located in the host computer unit.

BRIEF DESCRIPTION OF THE DRAWINGS

The invention will hereafter be described with reference to the accompanying drawings, wherein like numerals denote like elements, and.

DETAILED DESCRIPTION OF THE PREFERRED EXEMPLARY EMBODIMENTS

Figure 1:
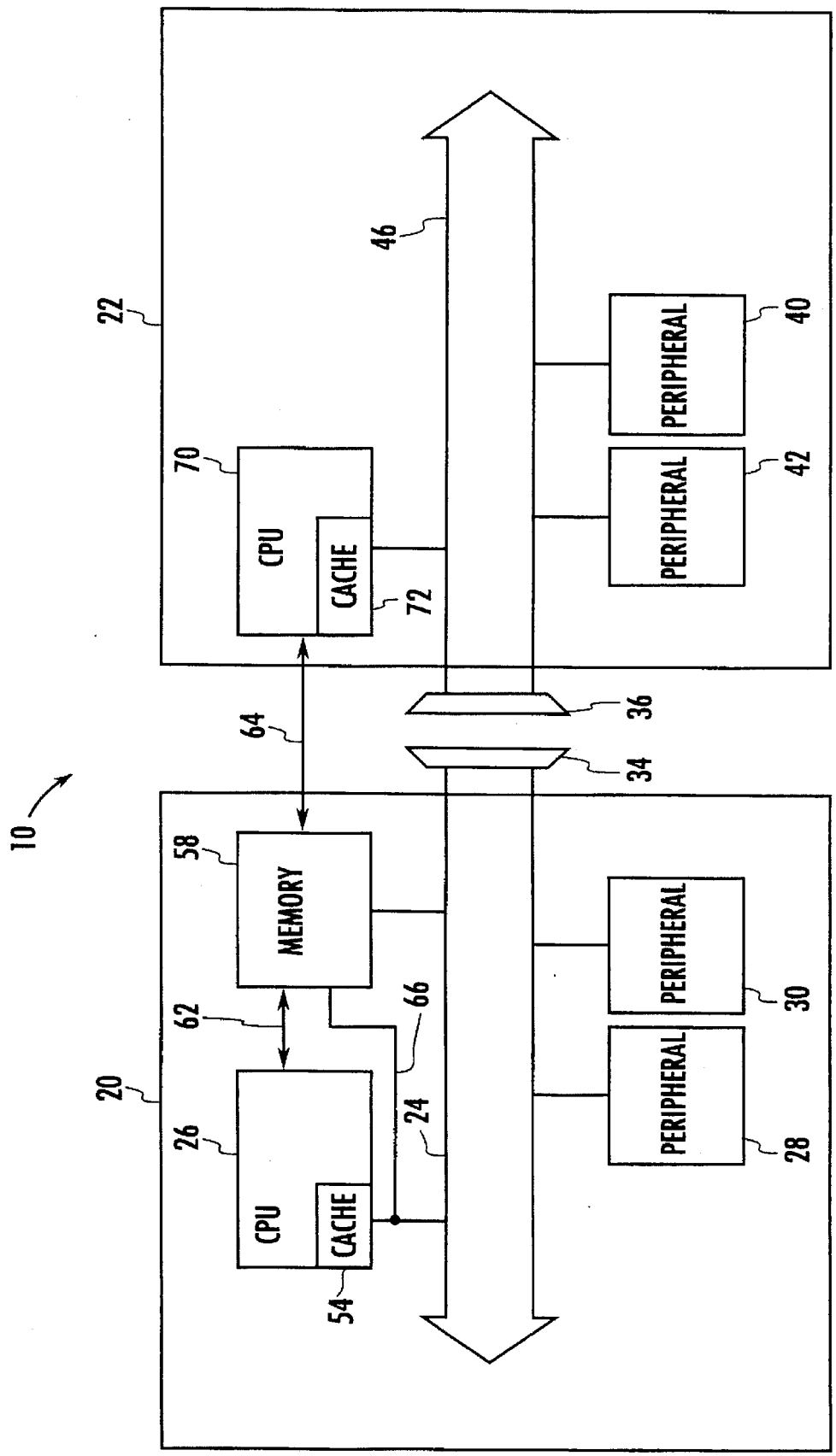
FIG. 1 schematically illustrates a dockable computer system in accordance with a first exemplary embodiment of the present invention.

FIG. 1 is a schematic block diagram of a dockable computer system 10 including a portable (laptop) computer 20 and a docking (host) station 22. Portable computer 20 is a mobile computer unit including a CPU 26, a memory 58 and a system bus 24. Portable computer 20 can also include a peripheral device 28 and a peripheral device 30.

CPU 26 preferably includes a cache 54 coupled with a bus 66 and is a high performance general purpose processor such as an Am386™ microprocessor, Am486™ microprocessor or other processing device. CPU 26 is coupled to memory 58 via a bus 62 and bus 66. Bus 66 may be part of bus 24 or a high performance host-to-memory bus coupled through a bridge (not shown) to bus 24.

System bus 24 couples CPU 26, peripheral device 28 and peripheral device 30. An external connector 34 is also coupled with system bus 24. System bus 24 can be a CPU-to-memory bus, an I/O bus, a standard bus, a sub-bus, a span bus or any type of bus functionally operative in the microcomputer environment. Preferably, bus 24 is a peripheral component interconnect (PCI) bus.

Docking station 22 includes a CPU 70 coupled with a docking bus 46. Docking station 22 can also include other CPUs (not shown), a peripheral device 40 and a peripheral device 42. CPU 70 can be a microcontroller, Am386™ microprocessor, Am486™ microprocessor, other processing device, or perhaps a more powerful microprocessor as warranted by applications for system 10, and it is within the scope of the present invention to utilize a minicomputer as the host system should the user so desire. CPU 70 includes a cache 72 coupled with bus 46. Preferably, caches 54 and 72 are integrated within their respective CPUs 26 and 70. Docking station 22 is a host station which can have superior, equal or inferior computing power compared to portable computer 20 depending on design needs, requirements or constraints.

Docking bus 46 couples CPU 70, peripheral device 40 and peripheral device 42. An external connector 36 is also coupled with docking bus 46. Docking bus 46 can be a CPU-to-memory bus, an I/O bus, a standard bus, a sub-bus, a span bus, or any type of bus as noted generally above. Preferably, docking bus 46 is a PCI bus.

When dockable computer system 10 is in an undocked state, external connector 34 and external connector 36 are not physically coupled. Therefore, in the undocked state, system bus 24 and docking bus 46 are not in physical electrical communication. In the undocked state, portable computer 20 is operable as a stand-alone computer and is physically separate from docking station 22.

When dockable computer system 10 is in a docked state, external connector 34 and external connector 36 are physically coupled. With connectors 34 and 36 coupled, CPU 26 can electrically communicate with components in docking station 22 such as peripheral device 40, peripheral device 42 and CPU 70 via system bus 24, connectors 34 and 36 and docking bus 46. In the docked state, docking station 22 receives portable computer 20 so that dockable computer system 10 operates as a single desktop computer or an integrated computer system.

Bus 62 is a bus capable of transferring SMP support signals such as synchronization signals, cache coherency signals and interrupt distribution signals between CPU 26 and memory 58. When system 10 is in the docked state, bus 64 is coupled with memory 58. Therefore, when docked, bus 64 is a communication channel which is capable of communicating the SMP support signals between portable computer 20 and docking station 22, or more specifically between CPU 70 and memory 58. Bus 64 is preferably a dedicated bus provided through connectors 34 and 36.

Synchronization signals coordinate the operations of CPU 26 and CPU 70 as they perform a common task. More particularly, synchronization signals allow CPU 26 and 70 to request exclusive ownership of a set of memory locations in memory 58. Exclusive ownership synchronizes CPU 26 and CPU 70 so they are not simultaneously manipulating data located in the same memory locations in memory 58 or peripheral devices 28, 30, 40 and 42. Simultaneous manipulation often creates invalid data because one processor may have recently changed or altered the data without notifying the other processor. Therefore, synchronization signals allow CPU 26 and CPU 70 to reserve memory locations and advantageously prevent CPU 26 and CPU 70 from operating on invalid data. Examples of synchronization signals are the LOCK (hard bus lock) signal and the PLOCK (pseudo lock) signal.

Cache coherency signals assist in maintaining valid state (tag) and data information in cache 54 and cache 72. During SMP operations, caches 54 and 72 each have copies of the same data (shared data copies) which must be consistent for proper SMP operation. The cache coherency signals monitor and manipulate the data in caches 54 and 72 to maintain consistency. Examples of cache coherency signals include the EADS (valid external address) signal for snooping data transfers and invalidating specific cache lines and the FLUSH (cache flush) signal for clearing cache lines.

Interrupt distribution signals allow system 10 to send particular interrupts to particular CPUs such as CPU 26 and CPU 70. During SMP operations, interrupts should be apportioned among the various CPUs such as CPU 26 and CPU 70 in system 10 to distribute the interrupt load. Overburdening one processor such as CPU 26 with a significant majority of interrupts may make the SMP operations inefficient and asynchronous. Examples of interrupt distribution signals include the INTR (MASK INTERRUPT) signal, and INTACK (interrupt acknowledge) signal. The INTACK signal acknowledges an interrupt period for each CPU 26 and 70.

Memory 58 can be a shared memory, centralized memory or distributed memory. Memory 58 is preferably a large dynamic random access memory (DRAM) integrated circuit located in portable computer 20. Generally, CPU 26 is able to transfer data to and from memory 58 through bus 66. CPU 70 is able to transfer data to and from memory 58 via bus 46, bus 24 and bus 66.

More particularly, CPU 26 receives data from cache 54 and communicates the data between cache 54 and memory 58 across bus 66. Similarly, CPU 70 receives data from cache 72 and communicates the data between cache 72 and memory 58 across bus 46, bus 24 and bus 66. Caches 54 and 72 are preferably large, high speed caches so CPU 26 and CPU 70 can continue to operate while bus 24 and bus 46 are busy or occupied with other resources of system 10.

System bus 24 and docking bus 46 are preferably high performance transfer buses which are capable of variable length burst cycles having unlimited burst lengths. Buses 24 and 46 have a 32 bit bus width which can be expanded, e.g. to a 64 bit bus width. The protocol on buses 24 and 46 advantageously supports overlapped bus arbitration (arbitrate for next cycle while current cycle is in progress). Thus, system 10 has an architecture optimized for SMP operation and yet allows portable computer 20 to remain light-weight and have minimal power consumption.

During SMP operations, CPU 26 and CPU 70 each respond to a stream of instructions and perform operations on data stored in memory 58 or otherwise provided on buses 24, 46 and 66. CPU 26 and CPU 70 may directly communicate data to each other, or may provide data through memory 58. CPU 26 and CPU 70 are also capable of providing messages across buses 24, 46 and 66.

CPU 26 and CPU 70 can store data from the same memory locations in memory 58 in their respective caches 54 and 72. Because both CPU 26 and CPU 70 may be operating on data from the same memory locations in memory 58 in their respective caches 54 and 72, dockable computer system 10 provides a system for ensuring that the data in caches 54 and 72 is consistent (not stale). Preferably, the system is a cache coherency protocol which ensures CPUs 26 and 70 are not reading or writing invalid (stale) data to and from memory 58.

"Stale" data refers to data which has been modified and has not yet been updated in caches 54 and 72. For example, if caches 54 and 72 both store a variable A (variable A is representative of data at a particular memory location in memory 58) and CPU 26 changes the value of variable A to a new number, the variable A stored in caches 54 and 72 is no longer correct (stale). If CPU 26 or 70 utilizes the stale variable A, a malfunction in system 10 or miscalculation can occur. Preferably, dockable computer system 10 utilizes a write invalidate or write broadcast snooping protocol as part of the cache coherency protocol to ensure cache coherency without unnecessarily burdening buses 24, 46 and 66 and CPUs 26 and 70. The snooping protocols utilize buses 62 and 66 to communicate cache coherency signals to and from memory 58.

In accordance with the write invalidate snooping protocol and the write broadcast snooping protocol, every cache, such as caches 54 and 72, having a copy of data from a block of memory 58 also has a copy of tag information concerning it.

The cache controllers (not shown) located in caches 54 and 72 can monitor or snoop the tag information via buses 46, 24 and 66 to determine whether or not caches 54 and 72 have a copy of the block of memory shared data. For example, the snooping protocol can require that on a read miss for a block of data, cache controllers in caches 54 and 72 check the tag information to determine whether caches 54 and 72 have a copy of the requested block and take appropriate action. The appropriate action may include supplying the data to the cache that experienced the read miss, obtaining the data from memory 58, or performing an interrupt subroutine. Similarly, on a write transaction for a new block of data, cache controllers in caches 54 and 72 check the tag information to see if caches 54 and 72 have a copy of the block of data and then take appropriate action such as invalidating their copy or changing their copy to the new block. Preferably, caches 54 and 72 are write-back caches, and CPU 26 and CPU 70 are capable of atomic transactions which advantageously reduce operations on buses 66, 24 and 46.

In the docked state, dockable computer system 10 may advantageously perform SMP operations to simultaneously operate video conferencing software with CPU 70 and perform general purpose computing operations with CPU 26. Such a configuration allows the user to perform general purpose computing operations such as database queries, memorandum editing, spreadsheet work and/or mathematical calculations while simultaneously participating in the video conference. This configuration is particularly useful in fulfilling "ubiquitous" computing goals because the mobile user has complete access to all host applications, files and other data (the dockable computer system is in the docked state) and can transfer information generated by the general purpose computing operations to other video conference participants.

Figure 2:
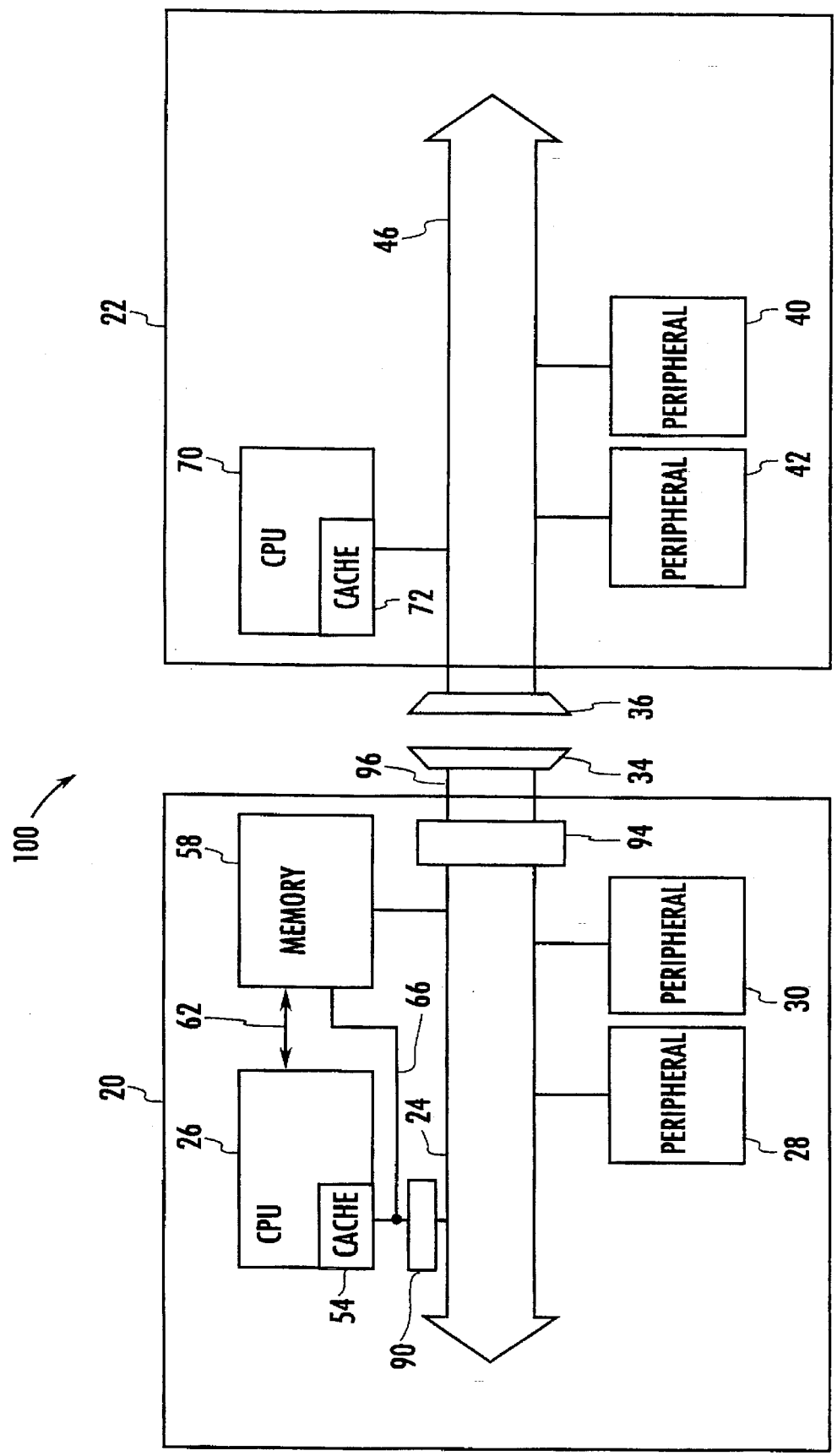
FIG. 2 schematically illustrates a dockable computer system in accordance with a second exemplary embodiment of the present invention.

Portable computer 20 and docking station 22 illustrated in FIG. 2 operate similarly to dockable computer system 10 discussed with reference to FIG. 1. However, dockable computer system 100 in FIG. 2 includes a docking bridge 94 coupled between bus 24 and a connector bus 96 and a host-PCI bridge 90 coupled between bus 66 and bus 24. Bridge 94 can also be utilized with system 10 illustrated in FIG. 1. Preferably, docking bridge 94 is a bridge device similar to the docking bridges discussed in U.S. patent application No. 08/217,951, filed Mar. 25, 1995, entitled, "Apparatus and Method for Achieving Hot Docking Capabilities for a Dockable Computer System," assigned to the assignee of the present invention. Alternatively, docking bridge 94 and bridge 90 can be similar to a host-to-PCI bridge, PCI-to-PCI bridge, a PCI-to-standard bridge, a host-to-host bridge, a standard-to-standard bridge or other type of bridge. Bridge 94 is advantageously designed to communicate SMP support signals across buses 24, 96 and 46 and is optimized for SMP operations.

Figure 3:
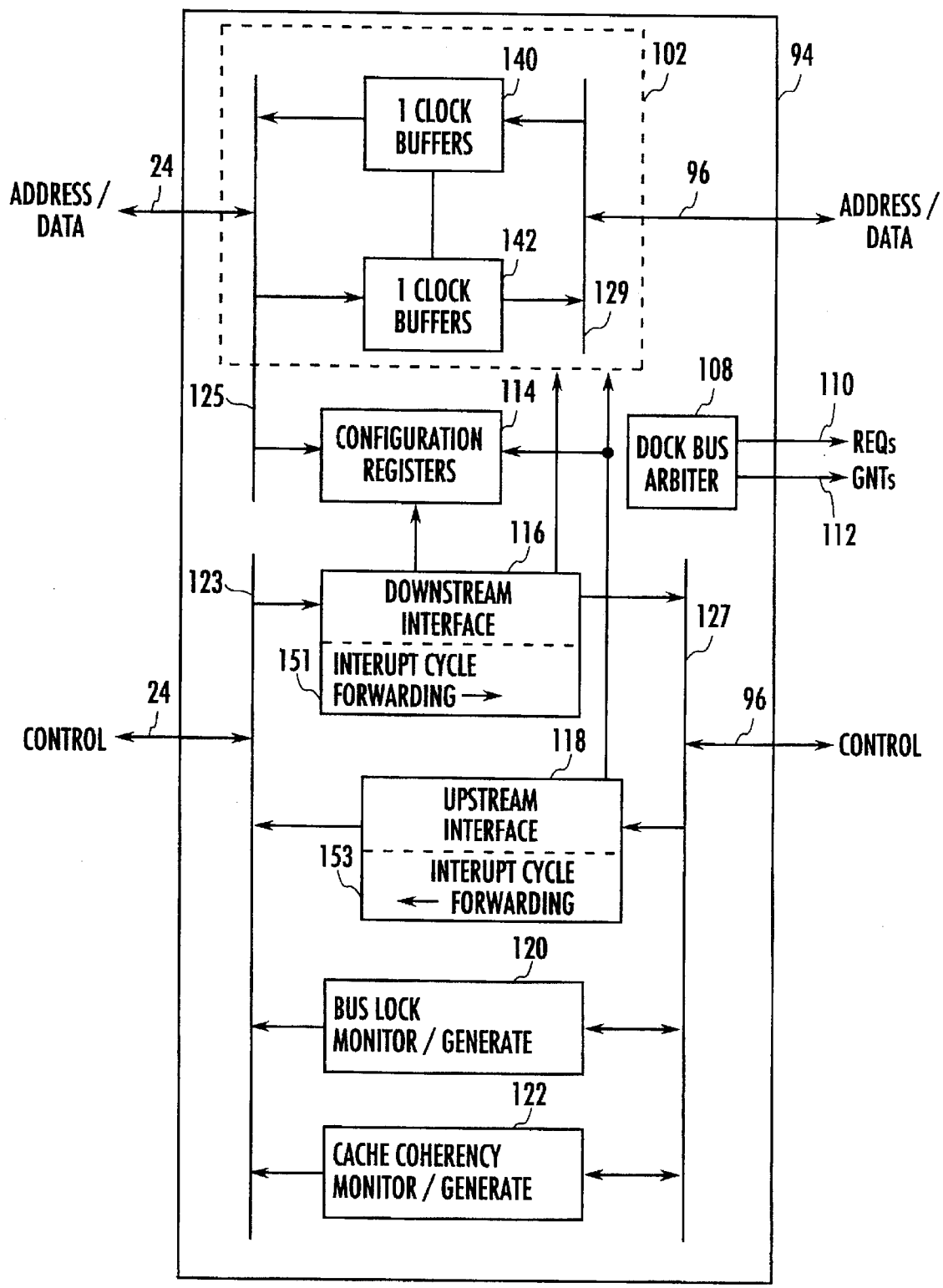
FIG. 3 is a more detailed schematic block diagram of a docking bridge in accordance with the second exemplary embodiment of the present invention for use in the system illustrated in FIG. 2.

With reference to FIG. 3, docking bridge 94 includes a data path circuit 102, a bus arbiter 108, configuration registers 114, a downstream interface 116, an upstream interface 118, a bus lock circuit 120 and a cache coherency circuit 122. Bus arbiter 108 provides bus arbitration functions for bus masters such as peripheral devices 28, 30, 40 and 42 on buses 24 and 46. Bus arbiter 108 is coupled with buses 24 and 96 and is preferably similar to the bus arbiters discussed in U.S. patent application Ser. No. 08/255,663, filed Jun. 3, 1994, entitled, "An Apparatus and Method for Granting Control of a Bus in a Computer System," assigned to the assignee of the present invention.

System bus 24 is coupled to a data path bus 125 and a control bus 123, and connector bus 96 is coupled with a data path bus 129 and a control bus 127. Data path buses 125 and 129 convey addresses and data from buses 24 and 96, respectively, to data path circuit 102. Control buses 123 and 127 provide control signals including the SMP support signals to and from downstream interface 116, upstream interface 118, bus lock circuit 120 and cache coherency circuit 122. Data path circuit 102 is coupled with downstream interface 116 and upstream interface 118. Downstream interface 116 and upstream interface 118 are also coupled with configuration registers 114. Configuration registers 114 are coupled with data path bus 125.

Data path circuit 102 includes a clock buffer 140 and a clock buffer 142 coupled between data path bus 129 and data path bus 125. Clock buffers 140 and 142 store data for at least one clock cycle delay and improve the drive capability of bridge 94. Clock buffers 140 and 142 advantageously provide a transparent bridge between buses 24 and 96 which can be configured to provide filter operations, improve drive capability, voltage level translation operations and signal isolation. Buffers 140 and 142 may be programmatically controlled by bits in configuration registers 114 to provide the above-mentioned operations. Clock buffers 140 and 142 are preferably 1-bit first in, first out (FIFO) memory devices. Alternatively, larger FIFOs may be utilized for larger clock delays.

Configuration registers 114 preferably include configuration data, command data, identification data, interrupt information, error status information, interrupt status information and other system parameters for bridge 94. More particularly, configuration registers 114 can include identification information for portable computer 20, CPU 26, CPU 70, and buses 24 and 46. Identification information can be utilized to programmably control data path circuit 102, upstream interface 118 and downstream interface 116. For example, the identification information may indicate bus speeds, voltage levels or other parameters related to buses 24 and 46.

Downstream interface 116 is a state machine which receives control signals such as read control, write control and other control signals on bus 123 and regenerates the control signals on bus 127. Upstream interface 118 is a state machine which receives control signals such as read control, write control and other control signals, and regenerates the control signals on bus 123. The state machines preferably regenerate the control signals in accordance with a PCI protocol.

Bus lock circuit 120 is also a state machine which receives synchronization signals on buses 123 and 127 and regenerates the synchronization signals on buses 123 and 127. The state machine implements a cache protocol for providing LOCK signals and PLOCK signals for buses 46 and 24. Bus lock circuit 120 can be configured to lock specific components such as devices 28, 30, 40 and 42, or to lock all components on a specific bus such as buses 24 and 26.

Similarly, cache coherency circuit 122 is a state machine for receiving cache coherency signals on buses 123 and 127. The state machine in cache coherency circuit 122 is preferably configured to regenerate cache coherency signals in accordance with a PCI protocol including SDONE and SBO signals. The SDONE (snoop done) signal indicates the status of the snoop for the current cache access. The SBO (SNOOP BACKOFF) signal indicates whether the current memory access may proceed or is required to be retried. In addition, cache coherency circuit 122 may implement a DRAGON protocol on top of the PCI bus protocol to reap SMP performance gains. The DRAGON protocol provides a specialty caching algorithm which enables superior cache updating and locking operations.

Downstream interface 116 includes an interrupt forwarding circuit 151 and upstream interface 118 includes an interrupt forwarding circuit 153. Interrupt forwarding circuits 151 and 153 are each coupled with data path circuit 102 and configuration registers 114. Interrupt forwarding circuits 151 and 153 preferably operate to distribute the interrupt loads among CPU 26 and CPU 70 and to communicate interrupt distribution signals on buses 24 and 96 and to configuration registers 114 and data path circuit 102. Interrupt forwarding circuits 151 and 153 are preferably configured to utilize encoded commands utilizing the PCI protocol. Circuits 151 and 153 may command special bus cycles as virtual wires for communicating INTR signals and INTACK signals or other messages across buses 24, 96 and 46, thereby decreasing the number of interrupt conductors and pins for system 100.

Docking bridge 94 is optimized for communicating SMP support signals from portable computer 20 to docking station 22. Docking bridge 94 advantageously receives signals on buses 24 and 96 and regenerates the signals in accordance with a suitable protocol such as a PCI protocol. The regeneration of signals by circuits 116, 118, 120 and 122 provides necessary isolation between system bus 24 and docking bus 46, and allows the signals to be altered for the specific configurations of portable computer 20 and docking station 22. Thus, docking bridge 94 advantageously ensures that the SMP support signals and other data is communicated throughout system 10 in accordance with SMP computing goals.

It is understood that, while the detailed drawings and specific examples given describe preferred exemplary embodiments of the present invention, they are for the purpose of illustration only. The apparatus and method of the invention is not limited to the precise details and conditions disclosed. For example, although specific processors are mentioned, a variety of processors from a variety of sources could be configured for SMP operations. Also, although the system bus is shown, a sub-bus or secondary bus could be utilized. Although a portable computer is described, the system is appropriate for any mobile computer unit including personal digital assistants (PDAs). As described herein, devices and buses are coupled when they are able to communicate signals without functionally destroying the meaning of the signals; intermediate structures located between devices or buses do not render them uncoupled. Further, single lines in the various drawings can represent multiple conductors. Various changes can be made to the details disclosed without departing from the spirit of the invention which is defined by the following claims.

We claim:

1. A dockable computer system capable of assuming at least two states, a docked state and an undocked state, said dockable computer system comprising:

a host station including a host bus and a general purpose host CPU coupled with said host bus, said host CPU having a host cache;

a portable computer including a computer bus, said host bus capable of electrical communication with said computer bus when said dockable computer system is in said docked state, said host bus being physically separate from said computer bus when said dockable computer system is in said undocked state, said portable computer having a general purpose portable CPU, said portable CPU having a portable cache coupled with said portable bus;

a main memory, said host CPU capable of directly communicating first data to and from said main memory and said host cache when said dockable computer system is in said docked state, and said portable CPU capable of directly communicating second data between said main memory and said portable cache when said dockable computer system is in said docked state, whereby said host CPU and said portable CPU are capable of symmetrical multi-processing operations when said dockable computer system is in said docked state;

a docking bridge; and a connector bus, said docking bridge being coupled between said connector bus and said portable bus, said docking bridge being intermediate said host bus and said portable bus when said dockable computer system is in said docked state, wherein said docking bridge includes a multi-processing bus for communicating multi-processing support signals between said portable bus and said host bus.

2. The dockable computer system of claim 1, wherein said multi-processing bus is in operative communication with said host CPU and said portable computer when said dockable computer system is in said docked state, said host CPU communicating multi-processing support signals across said multi-processing bus.

3. The dockable computer system of claim 2, wherein said multi-processing support signals are one or more synchronization signals, cache coherency signals or interrupt distribution signals.

4. The dockable computer system of claim 2, wherein said multi-processing support signals include synchronization signals, cache coherency signals and interrupt distribution signals.

5. The dockable computer system of claim 2, wherein said multi-processing support signals include a LOCK signal, a FLUSH signal and an INTR signal.

6. The dockable computer system of claim 2, wherein said multi-processing bus is a dedicated bus.

7. The dockable computer system of claim 6, wherein said multi-processing bus is in operative communication with said main memory and said host CPU when said dockable computer system is in said docked state, wherein said main memory is located in said portable computer.

8. A method of symmetrical multi-processing in a dockable computer system including a memory, a portable computer and a host station, said portable computer having a first general purpose CPU, a portable bus, a connector bus and a docking bridge and said host station having a second general purpose CPU and a host bus, said method comprising the steps of:

performing first processing operations with said first CPU;

simultaneously performing second processing operations with said second CPU; and transferring symmetrical multi-processing support signals from said host station to said portable computer and from said computer to said host station via said docking bridge, when said host station is docked with said portable computer, wherein said docking bridge being coupled between said connector bus and said portable bus, said docking bridge being intermediate said host bus and said portable bus when said dockable computer system is in said docked state, wherein said docking bridge includes a multi-processing bus for communicating multiprocessing support signals between said portable bus and said host bus.

9. The method of claim 8, wherein said multi-processing bus is a dedicated bus.

10. The method of claim 8, wherein said multi-processing support signals are any two of synchronization signals, cache coherency signals and interrupt distribution signals.

11. The method of claim 10, wherein said multi-processing signals are a LOCK signal, a FLUSH signal and an INTR signal.

12. The method of claim 8, wherein said first CPU is coupled with a first cache and said second CPU is coupled with a second cache, said method further comprising the steps of:

directly transferring first data from said memory to said first cache; and directly transferring second data from said memory to said second cache.

13. The method of claim 12, wherein said multi-processing bus is a dedicated multi-processing support signal bus coupled to said portable computer and said host station, said dedicated bus including cache control lines.

14. The method of claim 12, further comprising the step of:

transferring said first data from said first cache to said first CPU and simultaneously transferring said second data from said second cache to said second CPU.

15. A computer system comprising:

a main memory;

a main general purpose CPU;

a main bus coupled to said main memory and said main CPU;

a host general purpose CPU;

a host bus coupled to said host CPU; and an interface coupled to said main bus and said host bus, said host CPU communicating with said main CPU and said main memory across said host bus, said interface and said main bus, said interface including a communication channel for communicating symmetrical multi-processing support signals, wherein said interface includes:

a docking bridge; and a connector bus, said docking bridge being coupled between said connector bus and said main bus, said docking bridge being intermediate said host bus and said main bus when said dockable computer system is in said docked state, wherein said docking bridge includes a multi-processing bus for communicating multi-processing support signals between said main bus and said host bus.

16. The computer system of claim 15, wherein said multi-processing bus is a dedicated bus.

17. The computer system of claim 15, wherein said communication channel is comprised of dedicated conductors.

18. The computer system of claim 15, wherein said interface is comprised of a host connector coupled to said host bus and a main connector coupled to said main bus, said computer system being in a docked state when said host connector is physically coupled to said main connector and said computer system being in an undocked state when said host connector is physically separate from said main connector.

19. The computer system of claim 18, wherein said communication channel is comprised of dedicated conductors coupled to said main connector and said host connector.

20. In a dockable computer system comprised of a host computer station, including a host general purpose CPU and a station bus, and a mobile computer unit including a general purpose unit CPU and a unit bus, wherein said system is capable of residing in at least two distinct states, a docked state in which said unit is operatively associated with said station and an undocked state in which said unit is physically separate from said station, the improvement comprising:

a dedicated channel circuit in operative communication with said mobile computer unit and said host computer unit when said system is in said docked state for communicating symmetrical multi-processing support signals between said mobile computer unit and said host computer station, wherein said dedicated channel circuit includes:

a docking bridge and a connector bus, said docking bridge being coupled between said connector bus and said unit bus, said docking bridge being intermediate said station bus and said unit bus when said dockable computer system is in said docked state, wherein said docking bridge includes a multi-processing bus for communicating multi-processing support signals between said unit bus and said station bus.

21. The dockable computer system of claim 20, wherein said channel circuit is a dedicated bus including cache control lines.

22. The dockable computer system of claim 20, wherein said multi-processing bus is a dedicated bus.

23. The dockable computer system of claim 22, wherein said docking bridge utilizes a dragon protocol for said multiprocessing support signals.

24. A docking bridge for use in a dockable computer system including a general purpose host CPU coupled to a host bus and a general purpose portable CPU coupled to a portable bus, the docking bridge comprising:

a first bus coupled to said portable bus;

a second bus coupled to said host bus when said system is docked;

a data path circuit including a first buffer and a second buffer coupled between said first bus and said second bus, said data path circuit receiving first data on said first bus and storing said first data in said first buffer for at least one clock cycle and providing said first data on said second bus, said data path circuit receiving second data on said second bus and storing said second data in said second buffer for at least one said clock cycle and providing said second data on said first bus; and a docking bus arbiter coupled to said first bus and said second bus.

25. The docking bridge of claim 24, further comprising:

a bus lock circuit intermediate said first bus and said second bus, said bus lock circuit receiving synchronization signals on said first bus and providing said synchronization signals on said second bus, said bus lock circuit receiving said bus lock signals from said second bus and providing said bus lock signals on said first bus.

26. The docking bridge of claim 24, further comprising:

downstream interface and upstream interface intermediate said first bus and said second bus, said downstream interface and said upstream interface each including an interrupt cycle forwarding circuit for providing interrupt distribution signals on said first bus and said second bus.

27. The docking bridge of claim 24, wherein the system includes a portable connector coupled to the second bus.

28. The docking bridge of claim 27, wherein the system includes a host connector coupled to the host bus.

29. The docking bridge of claim 24, further comprising:

configuration registers coupled to said first bus and said data path circuit, said configuration registers including control bits for programmably controlling operations of said data path circuit.

30. The docking bridge of claim 29, further comprising:

a cache coherency circuit intermediate said first bus and said second bus, said cache coherency circuit receiving cache coherency signals on said first bus and providing said cache coherency signals on said second bus, said cache coherency circuit receiving said cache coherency signals on said second bus and providing said cache coherency signals on said first bus, said cache coherency circuit providing said cache coherency signals in accordance with a cache coherency protocol.

31. The docking bridge of claim 29, wherein said configuration registers include identification information about components within said dockable computer system.

32. The docking bridge of claim 26, further comprising:

configuration registers wherein said downstream interface and said upstream interface are coupled to said configuration registers, and wherein said configuration registers receive said interrupt distribution signals.

* * * * *